UNITED STATES PATENT OFFICE.

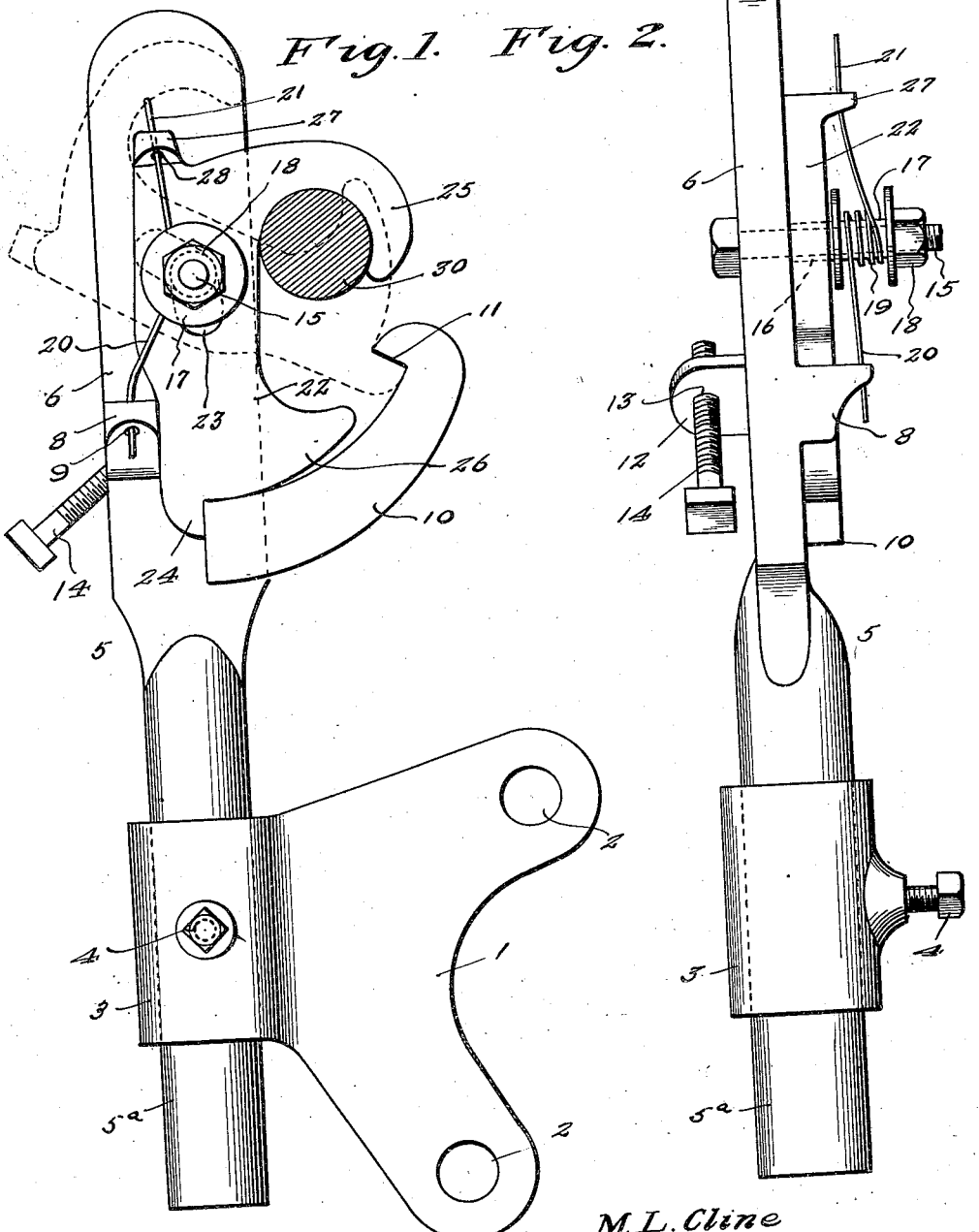

MARTIN L. CLINE AND FRANK HERGE, OF MALINTA, OHIO.

CLUTCH-LEVER RETAINER.

1,424,081.
Specification of Letters Patent.
Patented July 25, 1922.

Application filed July 8, 1921. Serial No. 483,347.

*To all whom it may concern:*

Be it known that we, MARTIN L. CLINE and FRANK HERGE, citizens of the United States, residing at Malinta, in the county of Henry and State of Ohio, respectively, have invented new and useful Improvements in Clutch-Lever Retainers, of which the following is a specification.

The object of our present invention is the provision of a retainer, designed more especially, though not necessarily, for employment in conjunction with the power clutch lever of a Fordson tractor, with a view to detachably securing the said lever in one position; the retainer being simple in construction and easy of operation, and being adapted to automatically lock the lever on movement of the lever in one direction and to automatically release the lever on a second movement in the same direction, both movements of the lever in the illustrated embodiment being downward to clutch the motor with the drive wheel.

To the attainment of the foregoing, the invention consists in the improvement as hereinafter described and definitely claimed.

In the accompanying drawings, forming part of this specification:—

Figure 1 is a rear elevation of our retainer, with the clutch lever in transverse section, and the locking dog shown by full lines and dotted lines in different positions.

Figure 2 is an edge elevation of the retainer,—i. e., in view taken at right angles to Figure 1.

Similar numerals of reference designate corresponding parts in both views of the drawings.

Among other elements the illustrated embodiment of our invention includes a bracket 1, apertured at 2 for the connection to the frame of a tractor and provided with a vertically disposed sleeve 3 in the wall of which is threaded a set screw 4. The illustrated embodiment also comprises an upright frame 5, having a lower portion 5ª preferably of circular form in cross section, disposed in the sleeve 3 and adapted to be engaged and adjustably fixed through the medium of a set screw 4. The upright or frame 5 also has an upper flat portion 6. At one side of the said flat portion 5 is a lateral stop 8 in which is an aperture 9, and disposed at one side of the flat portion 6 and projecting therefrom is an arm 10 on which is a terminal stop 11. It will also be observed by particular reference to Figure 2 that the flat upright portion 6 is provided at its opposite side, with reference to the stop 8 with a lateral lug 12 in which is a threaded aperture 13 to receive a bolt 14, the said bolt being provided for adjustment purposes, and its end being adapted to bear against the tractor frame.

Carried by the flat portion 6 of the upright 5 and extending laterally therefrom is a journal 15 preferably in the form of a headed and threaded bolt on which is an anti-friction cylinder 16, an anti-friction spool 17 and a nut 18. Coiled about the spool 17 is a spring 19, having an arm 20 loosely extended through and adapted to play in the aperture 9 of the stop 8, and also having an arm 21, for a purpose presently set forth.

In addition to the elements referred to the retainer comprises a swinging and sliding dog 22. The said dog 22 is slotted at 23 to receive the before mentioned anti-friction cylinder 16, and it will be noted by reference to Figure 1 that the dog is characterized by a heel stop 24, by a hook 25, by an arm 26 that extends in the same direction as the hook 25 from the major portion of the dog and by a lateral projection 27 in which is an aperture 28. The said aperture 28 loosely receives the before mentioned arm 21 of the spring 19. The stop 24 on the dog 22 is adapted to bring about against the heel of the arm 10 and against the terminal stop 11 of said arm 10 in different positions of the dog 22 as will be readily understood by reference to the different positions of the dog 22 shown in Figure 1. It will also be noted that in virtue of its slot 23 the dog 22 is capable of sliding and swinging on the anti-friction cylinder 16.

We show by dotted lines in Figure 1 the position in which the dog 22 rests when it is held in open state ready to receive the clutch lever designated by 30. Manifestly as the clutch lever 30 is moved downwardly, the stop 24 on the dog 22 slips along the arm 10 until the dog 22 is moved to the position illustrated by full lines in Figure 1 in which position the heel stop 24 of the dog assumes a location back of the heel of the arm 10. Incident to release of the clutch lever 30 the same is thrown upwardly by conventional means not of our invention, whereupon the clutch lever 30 by acting against the arm 25 will move the dog 22 endwise upwardly so as to raise the heel stop 24 from the said position behind the heel of the arm 10. At this time the clutch lever 30 will be held against upward movement by the arm 25 of the dog 22, and without liability of the clutch lever being casually released. When, however, it is desired to release the clutch lever 30 for upward movement thereof, it is simply necessary for the operator to press the lever downwardly whereupon the dog 22 will be rendered free to be swung by the spring 19 back to the inner position shown by dotted lines in Figure 1, and the lever 30 will be released for upward movement thereof.

We have entered into a detailed description of the construction and relative arrangement of parts embraced in the present and preferred embodiment of our invention in order to impart a full, clear and exact understanding of the said embodiment. We do not desire, however, to be understood as confining ourselves to the said specific construction and relative arrangement of parts inasmuch as in the future practice of the invention various changes and modifications may be made such as fall within the scope of our invention as defined in our appended claims.

Having described our invention, what we claim and desire to secure by Letters-Patent, is:—

1. The combination in a retainer, of a frame having stops, a sliding and swinging dog connected and movable with respect to the frame and having an arm to engage a device to be held and also having a stop, the latter for cooperation with the stops of the frame, and a spring to move the dog clear of the device to be held thereby for the release of said device.

2. The combination in a retainer, of a frame having stops, a sliding and swinging dog connected and movable with respect to the frame and having an arm to engage a device to be held and also having a stop, the latter for cooperation with the stops of the frame, and a spring to move the dog clear of the device to be held thereby for the release of said device; the said spring being coiled and supported on the frame and having terminal arms one of which is slidably engaged with the frame and the other of which is slidably engaged with the dog.

3. The combination in a retainer, of a frame having stops, a sliding and swinging dog connected and movable with respect to the frame and having an arm to engage a device to be held and also having a stop, the latter for cooperation with the stops of the frame, and a spring to move the dog clear of the device to be held thereby for the release of said device; the stop of the dog being located at the heel thereof, and two of the stops of the frame being spaced apart to receive between them the dog stop in one position of the dog, and a third stop of the frame being arranged for engagement by the dog stop in another position of the dog.

4. The combination in a retainer, of a frame having a stop projection at one side in which is an aperture, an arm on the frame and having a heel stop and a terminal stop, a sliding and swinging dog having a heel stop and also having an arm to engage and hold a lever or other device to be held and further having an apertured projection, said dog connected with said frame, and a spring having terminal arms slidably engaged in the apertures of the said stop and projection.

5. The combination in a retainer of an upright having at one side an apertured stop projection and also having at the same side an arm with heel and terminal stops, a lateral journal on the frame, a slotted dog receiving said journal and having a heel stop and an arm to engage a device to be held, and a spring connected with the frame and the dog to move the dog into position for the release of the device to be held.

In testimony whereof we affix our signatures.

MARTIN L. CLINE.
FRANK HERGE.